(12) United States Patent
Parish et al.

(10) Patent No.: US 12,723,676 B2
(45) Date of Patent: Sep. 1, 2026

(54) FLUID FLOW CONTROL DEVICES AND SYSTEMS, AND METHODS OF FLOWING FLUIDS

(71) Applicant: FLOWSERVE PTE. LTD., Singapore (SG)

(72) Inventors: Jeff Parish, Spanish Fork, UT (US); David Bartholomew, Payson, UT (US); James Davis, Mapleton, UT (US); Shanwei Guo, Singapore (SG); Kaushik Asokan, Singapore (SG)

(73) Assignee: FLOWSERVE PTE. LTD., Singapore (SG)

( * ) Notice: Subject to any disclaimer, the term of this patent is extended or adjusted under 35 U.S.C. 154(b) by 520 days.

(21) Appl. No.: 17/401,300

(22) Filed: Aug. 12, 2021

(65) Prior Publication Data

US 2023/0048962 A1 Feb. 16, 2023

(51) Int. Cl.

| | |
|---|---|
| ***F16K 47/06*** | (2006.01) |
| ***B33Y 10/00*** | (2015.01) |
| ***B33Y 80/00*** | (2015.01) |
| ***F16L 55/027*** | (2006.01) |

(52) U.S. Cl.

CPC ........ *F16K 47/06* (2013.01); *F16L 55/02772* (2013.01); *B33Y 10/00* (2014.12); *B33Y 80/00* (2014.12)

(58) Field of Classification Search

CPC .......... F16K 47/06; F16K 47/04; F16K 47/08; F16K 47/12; F16L 55/02772; B33Y 10/00; B33Y 80/00

See application file for complete search history.

(56) References Cited

U.S. PATENT DOCUMENTS

| | | | | |
|---|---|---|---|---|
| 4,923,166 | A | 5/1990 | Raftis | |
| 10,480,282 | B2 * | 11/2019 | Quin | F16K 47/08 |
| 10,480,683 | B2 | 11/2019 | Kuitunen | |
| 10,655,738 | B2 * | 5/2020 | McCaskill | F16K 47/08 |
| 10,941,878 | B2 * | 3/2021 | Parish | F16K 47/04 |

FOREIGN PATENT DOCUMENTS

| | | | | |
|---|---|---|---|---|
| CA | 3122198 | | 7/2020 | |
| DE | 4239767 | A1 * | 9/1993 | F16K 1/40 |

OTHER PUBLICATIONS

English Trnalstion of DE_4239767_A1 (Year: 1993).*

International Search Report and Written Opinion for PCT/US2022/037400, Oct. 20, 2022, 14 pages.

* cited by examiner

*Primary Examiner* — Jacob J Cigna

(74) *Attorney, Agent, or Firm* — BKRIP LLC

(57) ABSTRACT

Fluid flow control devices, systems, and methods may include a body extending along a longitudinal axis. The body has a fluid inlet at a first axial end of the body and a fluid outlet at a second axial end of the body. Channels may extend through an interior portion of the body between the fluid inlet at the first axial end and the fluid outlet at the second axial end. The channels collectively define fluid pathways through the body.

20 Claims, 4 Drawing Sheets

FLUID FLOW CONTROL DEVICES AND SYSTEMS, AND METHODS OF FLOWING FLUIDS

TECHNICAL FIELD

The present disclosure relates generally to fluid flow control devices, systems, and methods. More particularly, embodiments of the present disclosure may relate to fluid flow control devices configured to alter a property of a fluid passing through the fluid control device. For example, fluid control devices may redirect and/or reduce a force and/or energy of the fluid (e.g., pressure of the fluid) as the fluid passes through the fluid control device.

BACKGROUND

In many areas of industry, it is often necessary to reduce a force or energy (e.g., pressure) of fluids (e.g., liquids and/or gases) within a pipeline, valve, or another fluid handling assembly or device. One or more fluid control devices may be employed for this purpose. Various designs for control devices have been presented in the art. For example, a device may be employed to divide the flow through the device into one or more streams configured as one or more tortuous fluid flow paths within the device. As fluid passes through the tortuous fluid flow paths, the fluid changes direction many times. Furthermore, as the fluid travels through the tortuous fluid flow paths, the overall cross-sectional area of the fluid flow path may increase to provide a decrease in the velocity of the fluid within the flow path. The fluid pressure and energy of the fluid is partially dissipated along such paths as a result of losses caused by friction between walls of the path, rapid changes in fluid direction and expansion or contraction chambers. These devices may include what are commonly referred to as "tortuous path trim devices."

A fluid flow control device is often provided within a body of a valve or proximate thereto (e.g., a valve trim). Fluid flow control devices may also be provided in other portions of a fluid flow system. For example, fluid flow control devices may be placed in various fluid flow pathways (e.g., a choke tube or trim) to provide a reduction of fluid pressure where desirable within the system. By way of example, a multi-stage choke tube or trim may be used to create pressure breaks that reduce pressure in multiple stages. A conventionally designed and manufactured trim has a machined trim housed inside a sleeve to define the choke tube. Such flow devices are disclosed in, for example, U.S. Pat. No. 10,941,878, issued Mar. 9, 2021, to Flowserve Management Company, the disclosure of each of which is hereby incorporated herein in its entirety by this reference.

Pressurized fluids contain stored mechanical potential energy. A fluid flow control device dissipates this energy by reducing the pressure and velocity of the fluid. As the fluid flows through the fluid pathways, the fluid flow may be turbulent. Turbulent fluid has associated pressure and velocity fluctuations that act upon the structural elements of the pipes and fluid control devices in which the fluid is flowing. These pressure and velocity fluctuations are generally accompanied by other problems such as erosion, noise, vibration, and cavitation. In many applications, these accompanying problems are undesirable or unacceptable characteristics of a fluid flow control device.

The conventional choke trim is held together using multiple pins, which provide potential leakage paths, and sealed with multiple O-ring seals, which complicate assembly and may cause undesirable failures. For example, without the multiple seals, conventional designs have historically caused damage to the pressure containing body due to high velocity cavitation and erosion wear from the leakage paths around the pins and outside the sleeve at the exit of the choke trim.

BRIEF SUMMARY

Various embodiments of the present disclosure comprise fluid flow control devices that overcome many of the problems of conventional fluid flow control devices. The present disclosure describes embodiments of flow control devices that include fluid paths configured to better control cavitation, vibration, and other problems associated with fluid flow control.

In one or more embodiments, a fluid flow control device may include a substantially cylindrical body extending along a longitudinal axis. The substantially cylindrical body has a fluid inlet at a first axial end of the substantially cylindrical body and a fluid outlet at a second axial end of the substantially cylindrical body. Channels extend through an interior portion of the substantially cylindrical body from the fluid inlet at the first axial end to the fluid outlet at the second axial end. The channels collectively define fluid pathways through the substantially cylindrical body to reduce a pressure of a fluid traveling through the fluid pathways, where each of the channels intersect at least one other channel of the channels.

In further embodiments, a fluid flow system may include a fluid handling component defining a fluid flow path through the fluid handling component and a flow control device in the fluid flow path of the fluid handling component. The flow control device may include an elongated body extending along a longitudinal axis. The elongated body has a fluid inlet at a first longitudinal end of the elongated body and a fluid outlet at a second longitudinal end of the elongated body. Channels are defined within the elongated body and extend between the fluid inlet at the first longitudinal end to the fluid outlet at the second longitudinal end. The channels collectively define fluid pathways through the elongated body to reduce a pressure of a fluid traveling through the fluid pathways from the fluid inlet to the fluid outlet. The channels may be positioned and configured such that fluid flow from the channels impinges upon the fluid flow from at least one adjacent channel of the channels proximate the fluid outlet.

In further embodiments, a method of decreasing pressure in a fluid with a fluid flow control device may include receiving a high-pressure fluid into a fluid inlet of a body at a first axial end of the body; directing the high-pressure fluid through channels defined within the body to lower pressure in the high-pressure fluid to a lower-pressure fluid; and exiting the lower-pressure fluid at a fluid outlet of the body at a second axial end of the body.

Additional embodiments include methods for forming a fluid flow control device including building up a body of a fluid flow control device through an additive manufacturing process and concurrently defining one or more channels in body during the additive manufacturing process.

DETAILED DESCRIPTION

Figure 1:
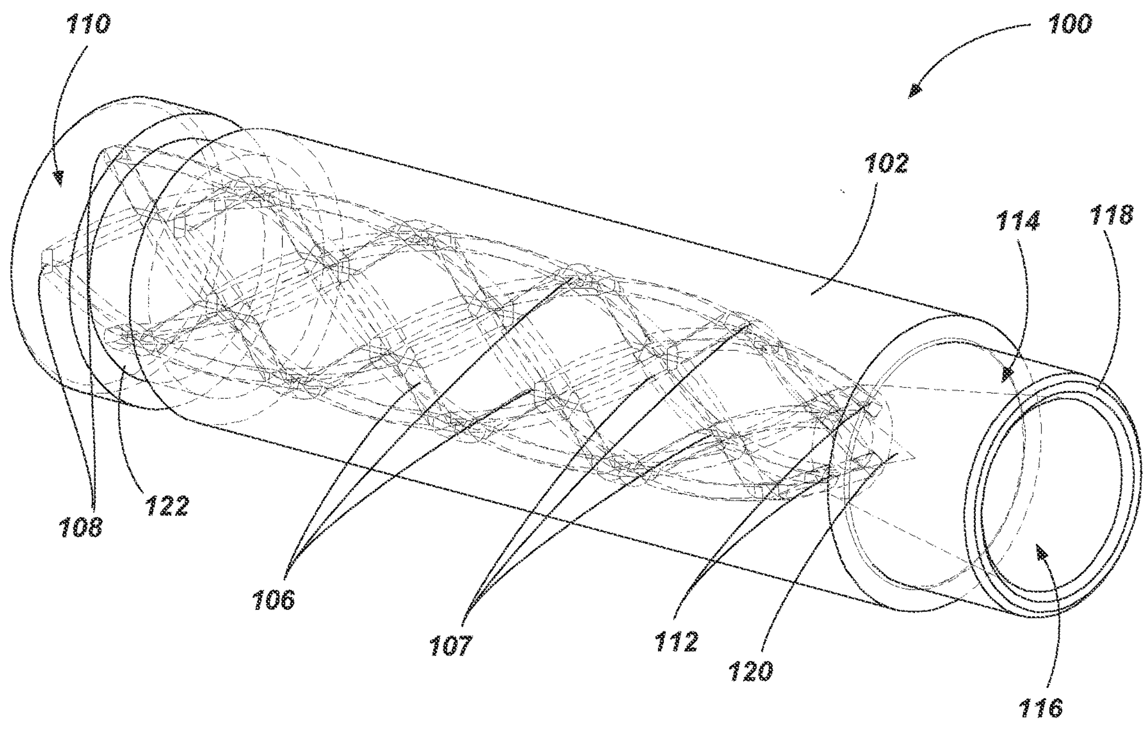
FIG. 1 is a perspective view of a fluid flow control device according to embodiments of the present disclosure.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in some embodiments," and similar language throughout this specification may, but do not necessarily, all refer to the same embodiment.

The illustrations presented herein are, in some instances, not actual views of any particular device, apparatus, system, or method, but are merely idealized representations that are employed to describe the present disclosure. In the following detailed description, reference is made to the accompanying drawings, which form a part hereof, and in which is shown, by way of illustration, specific embodiments in which the disclosure may be practiced. These embodiments are described in sufficient detail to enable a person of ordinary skill in the art to practice the disclosure. However, other embodiments may be utilized, and structural, logical, and other changes may be made without departing from the scope of the disclosure. The illustrations presented herein are not meant to be actual views of any particular device or system, but are merely idealized representations that are employed to describe embodiments of the present disclosure. The drawings presented herein are not necessarily drawn to scale. Additionally, elements common between drawings may retain the same or have similar numerical designations.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

Various embodiments of the present disclosure comprise fluid flow control devices. In some embodiments, the fluid flow control devices may be formed as substantially one-piece components that direct fluid flow through the component. For example, the fluid flow control devices may comprise choke tubes or trims used within or proximate a valve and/or in other portions of a fluid flow system that define a fluid flow path in a single structure (e.g., monolithic structure, a continuous structure, etc.).

In some embodiments, the fluid flow control devices may be formed in an additive manufacturing process that provides the component defining the fluid flow path in a single structure and may convert a conventional multi-part assembly into a monolithic unit, thereby, reducing the overall part count. Such fluid flow control devices may not require the conventional multiple pins and additional O-ring seals for installation and may reduce potential leakage and/or erosion paths while simplifying assembly.

In some embodiments, the fluid flow control devices may include output features that mutually impinge the exiting fluid streams toward the center of the choke trim at or near the exit that may reduce erosion on the body and pipe wall downstream. Such output features that impinge the flow would have otherwise been difficult, if not impossible, to produce by conventional subtractive manufacturing means. Where implemented, the fluid flow control devices formed using additive manufacturing to produce the choke trim have the added advantage of one or more of reducing production lead time, the ability to produce the choke trim in multiple variations in combination of channel shape, size and intersections with complexity, at little to no added cost (e.g., high mix, low volume), and expanding the range of possible materials used for the construction of the choke trim. Further, additive manufacturing may enable variations in design and functional capabilities that would otherwise not be possible with conventional manufacturing methods.

FIG. 1 illustrates a perspective view of an embodiment of a fluid flow control device 100 having an elongated body (e.g., a substantially cylindrical body 102) extending along a longitudinal axis 104. In additional embodiments, the body 102 of the fluid flow control device 100 may have other shapes (e.g., elongated or otherwise).

It is noted that in FIG. 1 and in other drawings of the disclosure, for clarity, internal features of the fluid flow control device 100 (e.g., channels, cavities, etc.) may be shown in dashed lines so that these features are viewable for the associated description.

Figure 2:
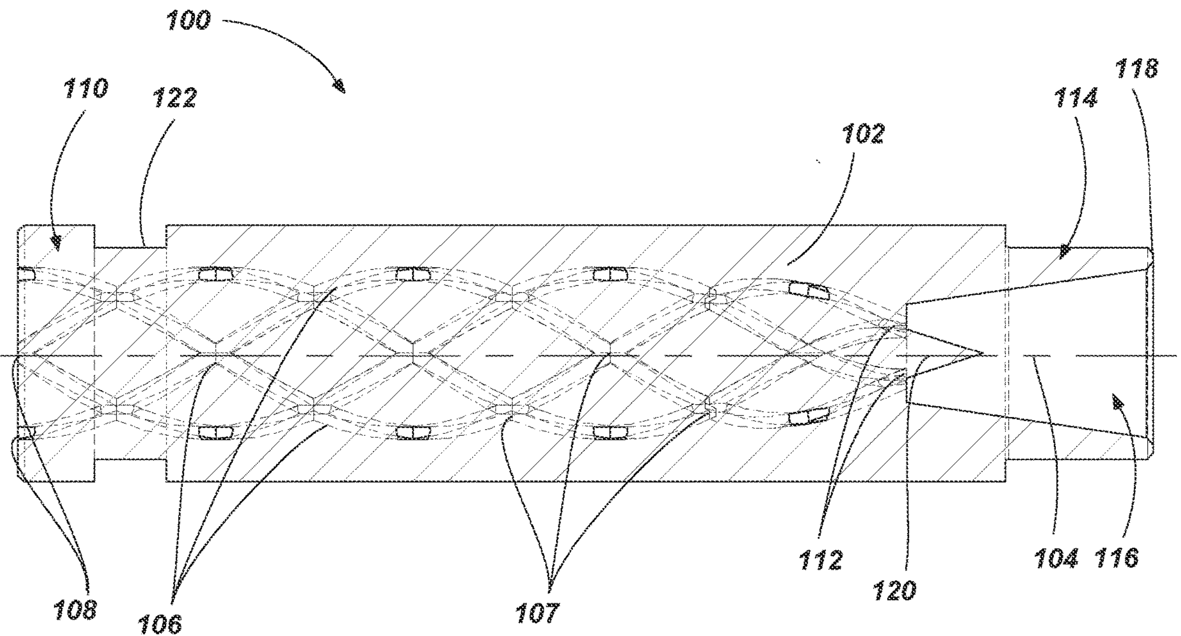
FIG. 2 is a cross-sectional view of a fluid flow control device according to embodiments of the present disclosure.
Figure 3:
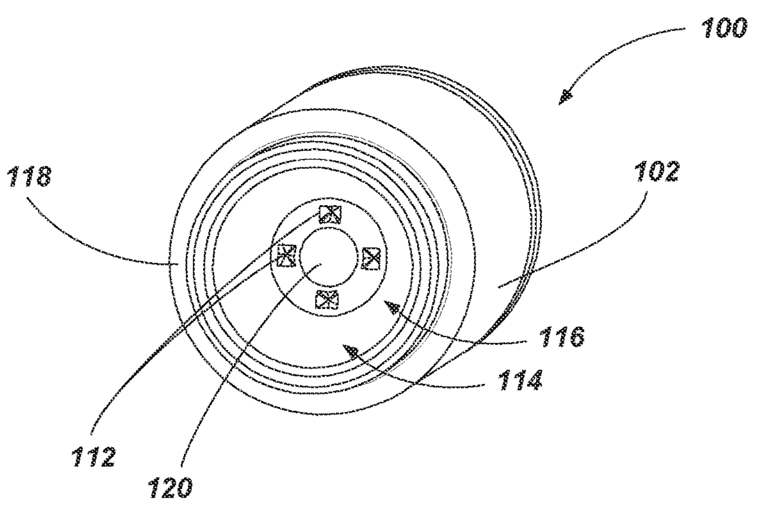
FIG. 3 is a perspective end view of a fluid flow control device according to embodiments of the present disclosure.

FIG. 2 is a cross-sectional view of a fluid flow control device (e.g., fluid flow control device 100 with the internal channel portions being shown in dashed lines) and FIG. 3 is a perspective end view of a fluid flow control device (e.g., fluid flow control device 100) shown the outlet end of the fluid flow control device 100.

As shown in FIGS. 1 through 3, the substantially cylindrical body 102 extends along a longitudinal axis 104. Channels 106 are defined within the substantially cylindrical body 102 (e.g., as shown in dashed lines illustrating the boundaries of the channels 106). The channels 106 extend from fluid inlets 108 at a first longitudinal (e.g., axial) portion or first axial end 110 of the substantially cylindrical body 102 to fluid outlets 112 proximate or at a second longitudinal (e.g., axial) portion or second axial end 114 that opposes the first axial end 110 to collectively define fluid pathways through the substantially cylindrical body 102.

The channels 106 may be defined within an interior portion of the substantially cylindrical body 102, which may be formed as a substantially single piece, monolithic structure. For example, the channels 106 are defined substantially within (e.g., completely within) the substantially cylindrical body 102 and are surrounded by the substantially cylindrical body 102 on all sides, with the exception of the openings of the channels 106 at the fluid inlets 108 at the first axial end 110 and at the fluid outlets 112 at the second axial end 114. Such channels 106 may be distinguished from partial channels or grooves that are formed in a sidewall of a body (e.g., an exterior or interior sidewall of the body) where one portion or side of such channels are open unless paired with another structure that defines another portion of the channels. By contrast to grooves formed by the combination of two or more bodies with mating elements of partial channels or unpaired grooves, a majority of the channels 106 (e.g., a substantially entirety) extending through the substantially cylindrical body 102 are defined only by the single substantially cylindrical body 102 rather than by multiple components that are implemented together in unison to define the channels between two or more separate components.

The channels 106 may extend through the substantially cylindrical body 102 to alter at least one property (e.g., force, energy, flow direction) of the fluid (e.g., liquids and/or gases). For example, the channels 106 extending through the substantially cylindrical body 102 may act as an energy reduction element (e.g., pressure reducing element) for one or more portions of a fluid handling system (e.g., control valves, tubes, fittings, etc.). In some embodiments, the geometry of the channels 106 may act to control cavitation in fluids to reduce noise. For example, various patterns of the channels 106 define fluid paths to reduce or substantially prevent cavitation of fluid and/or to otherwise improve the flow of a fluid through the channels 106. Relatively longer lengths of the cylindrical bodies 102 may be used to reduce turbulence, shear, and fluid velocity. In some embodiments, the channels 106 in the body 102 may be sized and configured to handle entrained solids in single or multi-phase process fluids and slurries.

In some embodiments, as depicted, one or more of the channels 106 may each intersect one or more adjacent channels 106 (e.g., at intersections 107). The channels 106 may be configured with a selected angle of intersection between channels 106 to customize the effects of the intersections 107 (e.g., a selected amount of energy reduction). For example, the channels 106 may be configured to intersect at least one other channel 106, where the intersections 107 define energy reduction stages. The number of stages may be determined by the number of intersections 107 and may be selected based on the particular application. By way of example and not limitation, each channel 106 may comprise between one and twenty stages or even more in selected embodiments.

In additional embodiments, the channels 106 may not include intersections and may extend continuously (e.g., without interruption) through the substantially cylindrical body 102 from the fluid inlets 108 to the fluid outlets 112.

In additional embodiments, the substantially cylindrical body 102 may be used as downstream blow down and/or choke tube or trim elements. As a downstream element, the substantially cylindrical body 102 may be used to produce the pressure drop control either in an on/off configuration or in conjunction with a throttling element upstream that could include a valve, manifold, or plug either in a linear or rotary fashion. In this manner, the fluid flow control device 100 may be implemented to provide desired fluid flow control characteristics.

As depicted, the channels 106 extend longitudinally at an oblique angle with respect to the longitudinal axis 104 of the substantially cylindrical body 102. The channels 106, which may have an arcuate shape, spiral within the cylindrical body 102 (e.g., defining a substantially helical formation). The channels 106 may extend at differing angles relative to other channels 106 (e.g., opposite angles). The number of channels 106 and the configuration of channels 106 may vary with each desired application. The channels 106 may be arcuate in shape or may have other curved, linear, and/or polygonal configurations.

In some embodiments, the channels 106 intersect one or more additional channels 106 as the channels 106 extend around the substantially cylindrical body 102. The combination of fluid pathways being by the channel paths and the intersections 107 of the channels 106 define a pattern of the channels 106 in the substantially cylindrical body 102. The pattern of channels 106 may assist in defining the flow properties of a fluid flowing through the channels 106. In some embodiments, the patterning of the channels 106 may be selected to reduce the cavitation of a fluid passing therethrough. In the depicted embodiment, a diamond pattern is defined through the substantially cylindrical body 102 by the channels 106. In additional embodiments, other patterns may be implemented, including offset brick patterns, grid patterns, zigzag patterns, tooth patterns, recirculating patterns, and the like and combinations thereof. Furthermore, the patterning may be configured to have constant separation such that channel spacing remains constant along the length of the substantially cylindrical body 102, or it may be configured, in some embodiments, to have an expanding separation such that channel spacing changes or varies along the length of the substantially cylindrical body 102.

In some embodiments, the channels 106 may traverse substantially the entire length of the substantially cylindrical body 102. In additional embodiments, the channels 106 may traverse only a portion of the length of the substantially cylindrical body 102. For example, the substantially cylindrical body 102 may include a cavity 116 at one or more of the longitudinal ends of the substantially cylindrical body 102 (e.g., at the second axial end 114). As depicted, the cavity 116 may extend axially along the longitudinal axis 104 into the substantially cylindrical body 102. The cavity 116 may have a tapered (e.g., frustoconical) shape having an enlarging cross-sectional area as the cavity 116 opens at a terminal end 118 of the substantially cylindrical body 102.

With the cavity 116, the fluid outlets 112 of the channels 106 may be positioned within the substantially cylindrical body 102 at the innermost portion of the cavity 116, which may be considered the second axial end 114. In such an embodiment, the substantially cylindrical body 102 may include the terminal axial end 118 that is position downstream of the second axial end 114 at the outermost portion of the cavity 116 (e.g., at a fluid outlet of the overall cylindrical body 102). In embodiments without the cavity 116, the second axial end 114, with respect to both the channels 106 and the terminal end of the body 102 may be coincident.

In some embodiments, spacing between the channels 106 (e.g., radial spacing) may vary along the substantially cylindrical body 102. As depicted, spacing between the channels 106 may decrease as the channels 106 approach and reach the fluid outlets 112 such that the channels 106 begin to converge at the fluid outlets 112. In such embodiments, the converging channels 106 may define fluid pathways that direct the fluid streams traveling therethrough to intersect after exiting through the fluid outlets 112. For example, the converging channels 106 may define fluid pathways that are angled toward each other (e.g., extending radially inward) such that the fluid stream will impinge after exiting the substantially cylindrical body 102. As noted above, the impinging of the fluid streams may reduce erosion on the body 102 and/or downstream components, such as, for example, pipe or tube walls.

In some embodiments, the channels 106 may converge with one or more adjacent channels 106 at the fluid inlets 108, at the fluid outlets 112, or at both the fluid inlets 108 and the fluid outlets 112. The channels 106 may be directed toward each other in order to direct the fluid toward a central portion of the substantially cylindrical body 102 (e.g., a central portion of the cavity 116).

In some embodiments, the substantially cylindrical body 102 may include a fluid direction structure (e.g., cone 120 positioned within the cavity 116) to guide fluid flow as the flow exits the channels 106 from the fluid outlets 112. For example, the cone 120 may act to reduce the chance of a backwash area forming at the fluid outlets 112.

In some embodiments, one or more portions of the fluid flow control device 100 may include a sealing feature for defining at least a partial seal when the fluid flow control device 100 is installed in a fluid flow system. For example, the substantially cylindrical body 102 may include one of more grooves (e.g., groove 122) that may receive one or more seals (e.g., an O-ring) within the groove 122.

The substantially cylindrical body 102 may be formed using materials such as ceramics, metals (e.g., alloys, steels, stainless steel), sintered materials (e.g., metals and/or ceramics), polymers, other materials having a relatively high hardness or erosion resistance, and combinations thereof (e.g., cermets). Of course, it is contemplated that other materials may be used as well, depending on the application. As noted above, in some embodiments, the substantially cylindrical body 102 and the channels are formed concurrently in an additive manufacturing buildup process regardless of the chosen material or materials used in the process. In some embodiments, combinations of additive and traditional manufacturing may be implemented.

In some embodiments, the channel type may be selected based on the varying properties and characteristics that affect the flow of a fluid through the corresponding channels 106. The geometry and positioning of the channels 106 may be selected according to application to achieve the desired functionality of the channels. In some embodiments, the channels 106 may not be limited to a constant inner dimension (e.g., diameter or width), but may vary along the length of the channels 106. In some embodiments, the diameter of the channels 106 may increase or decrease as the channel 106 extends along the length of a substantially cylindrical body 102. In other embodiments, the diameter of the channels 106 may fluctuate along the channel path to further define the flow characteristics with each channel 106. The diameter and/or length of the channels 106 may vary depending on the particular application and the size and geometry of the substantially cylindrical body 102.

Figure 4:
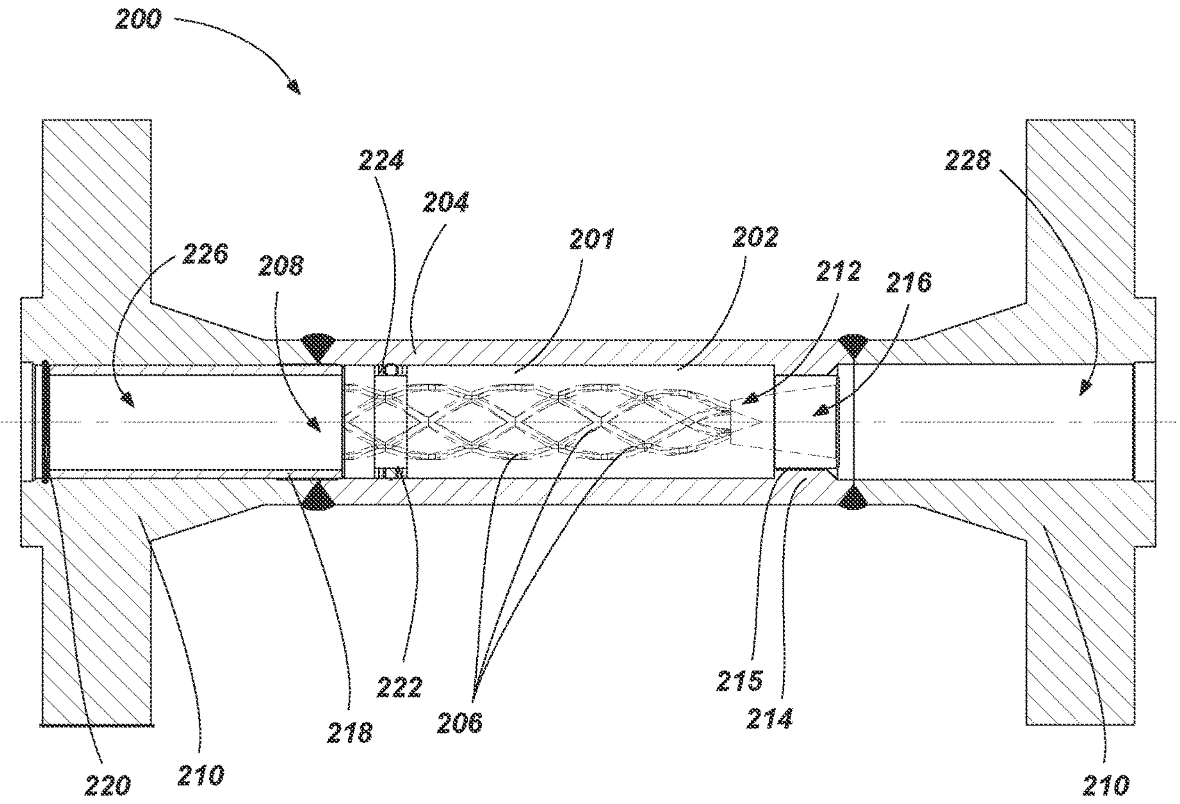
FIG. 4 is a partial cross-sectional view of a portion of a fluid flow control system including a fluid flow control device according to embodiments of the present disclosure.

FIG. 4 is a partial cross-sectional view of a portion of a fluid flow control system 200 including a fluid flow control device 201. In some embodiments, the fluid flow control device 201 may be similar to, and include the same or similar components or configurations of the fluid flow control device 100 discussed above. As above, internal features of the fluid flow control device 201 (e.g., channels, cavities, etc.) may be shown in dashed lines so that these features are viewable for the associated description. As depicted, the fluid flow control device 201 is a side view with internal features shown in dash while the remaining portions of the fluid flow control system 200 are shown in cross section.

As shown in FIG. 4, the fluid flow control device 201 has a substantially cylindrical body 202, which may be configured as a choke tube, and is received in a pipe 204 (also referred to as a tube). Similar to, or the same as, that discussed above, channels 206 are defined within the substantially cylindrical body 202. The channels 206 extending from fluid inlets 208 to fluid outlets 212. As above, the channels 206 may be defined within an interior portion of the substantially cylindrical body 202, which may be formed as a substantially single piece, monolithic structure.

As depicted, the pipe 204 may include ends (e.g., flanged ends 210) for connecting the pipe 204 to other portions of the fluid flow control system 200. The fluid flow control device 201 may be secured within the pipe 204 by any suitable method (e.g., mechanical fastening, welding, interference fit, adhesives, etc.). For example, an end or portion of the fluid flow control device 201 (e.g., proximate the fluid outlets 212) may be received in a reduced dimension portion 214 (e.g., a necked portion having a reduced diameter) of the pipe 204. As depicted, the fluid flow control device 201 may include a complementary reduced diameter portion 215 that fits within the reduced dimension portion 214 of the pipe 204 with a shelf preventing any further movement in the downstream direction. Another end or portion of the fluid flow control device 201 (e.g., proximate the fluid inlets 208) may be retained with a removable feature. For example, the pipe 204 may include retainer sleeve 218 that is secured in the pipe 204 with a retainer ring 220. Removal and installation of the retainer sleeve 218 and the retainer ring 220 may enable the fluid flow control device 201 to be installed and removed from the pipe 204 as desired (e.g., for servicing, replacement, and/or modification of the energy reduction characteristics, etc.).

As noted above, the fluid flow control device 201 may include a groove 222 that receives one or more sealing elements 224 (e.g., an O-ring with one or more backup rings) for defining a seal between the pipe 204 and the fluid flow control device 201 to minimize or substantially prevent unintended flow within the fluid flow control system 200 between the pipe 204 and the fluid flow control device 201.

In operation, fluid may be provided from an upstream portion 226 of the pipe 204 and directed through the fluid flow control device 201. As the fluid from the upstream portion 226 of the pipe 204 passes into the fluid inlets 208 and through the fluid flow control device 201, an amount of energy in the fluid (e.g., pressure) may be reduced before it is expelled at the fluid outlets 212 and into the downstream portion 228 of the pipe 204. As above, the channels 206 of the fluid flow control device 201 may begin to impinge upon one another at the fluid outlets 212 (e.g., within cavity 216) in order to direct the fluid toward a central portion of the downstream portion 228 of the pipe 204. In some embodiments, such a reorienting of the flow may reduce to amount of fluid force applied to the pipe 204 at the fluid outlets 212 (e.g., to reduce wear or erosion of the wall of the pipe 204 from jets of the fluid exiting at the fluid outlets 212).

Figure 5:
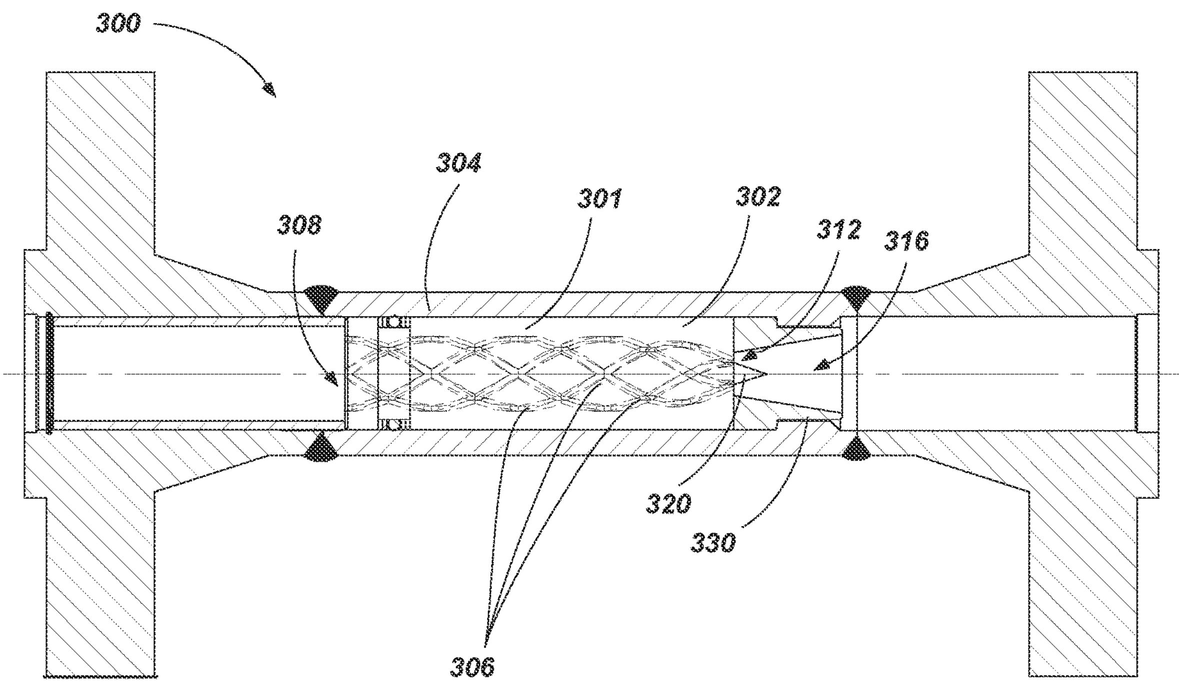
FIG. 5 is a partial cross-sectional view of a portion of a fluid flow control system including a fluid flow control device according to embodiments of the present disclosure.

FIG. 5 is a partial cross-sectional view of a portion of a fluid flow control system 300 including a fluid flow control device 301. In some embodiments, the fluid flow control device 301 and/or system 300 may be similar to, and include the same or similar components or configurations of the fluid flow control devices 100, 201 and system 200 discussed above. As above, internal features of the fluid flow control device 301 (e.g., channels, cavities, etc.) may be shown in dashed lines so that these features are viewable for the associated description. As depicted, the fluid flow control device 301 is a side view with internal features shown in dash while the remaining portions of the fluid flow control system 300 are shown in cross section.

As shown in FIG. 5, the fluid flow control device 301 may be configured as a choke tube and received in a pipe 304 (e.g., secured and sealed in the pipe 304 as discussed above). Similar to, or the same as, that discussed above, the channels 306 are defined within a substantially cylindrical body 302. The channels 306 extending from fluid inlets 308 to fluid outlets 312. As above, the channels 306 may be defined within an interior portion of the substantially cylindrical body 302, which may be formed as a substantially single piece, monolithic structure.

As depicted, both the fluid inlets 308 and fluid outlets 312 may be positioned at terminal ends of the substantially cylindrical body 302. The fluid flow control device 301 may include a separate outlet ring 330 that defines cavity 316 at the fluid outlets 312. In such an embodiment, the cone 320 may be part of the substantially cylindrical body 302 or the separate outlet ring 330 and may extend beyond the terminal end of the substantially cylindrical body 302 at the fluid outlets 312.

As noted above, the channels 306 may optionally converge proximate the fluid outlets 312 before the channels 306 terminate at the fluid outlets 312 enabling fluid to pass the cavity 316 of the separate seat ring 330.

Figure 6:
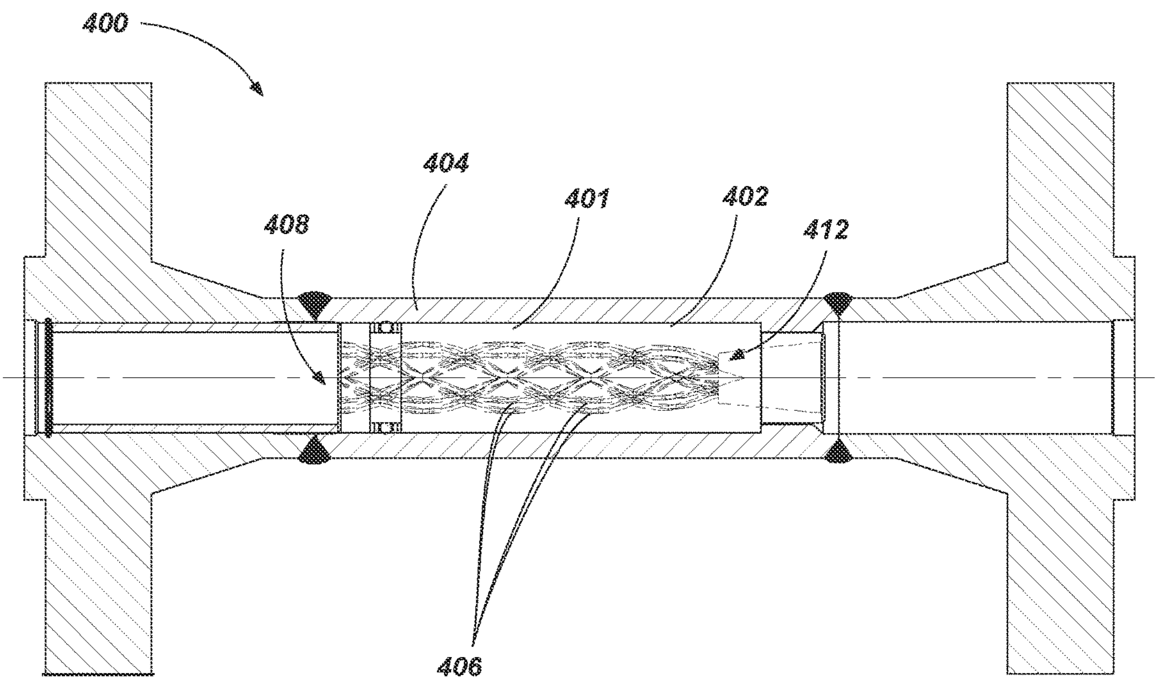
FIG. 6 is a partial cross-sectional view of a portion of a fluid flow control system including a fluid flow control device according to embodiments of the present disclosure.

FIG. 6 is partial cross-sectional view of a portion of a fluid flow control system 400 including a fluid flow control device 401. In some embodiments, the fluid flow control device 401 and/or system 400 may be similar to, and include the same or similar components or configurations of the fluid flow control devices 100, 201, 301 and systems 200, 300 discussed above. As above, internal features of the fluid flow control device 401 (e.g., channels, cavities, etc.) may be shown in dashed lines so that these features are viewable for the associated description. As depicted, the fluid flow control device 401 is a side view with internal features shown in dash while the remaining portions of the fluid flow control system 400 are shown in cross section.

As shown in FIG. 6, the fluid flow control device 401 may be configured as a choke tube and received in a pipe 404 (e.g., secured and sealed in the pipe 404 as discussed above). Similar to, or the same as, that discussed above, channels 406 are defined within a substantially cylindrical body 402. The channels 406 extending from fluid inlets 408 to fluid outlets 412. As above, the channels 406 may be defined within an interior portion of the substantially cylindrical body 402, which may be formed as a substantially single piece, monolithic structure.

As depicted, the fluid flow control device 401 may include additional channels 406. For example, the helical structure of the channels 406 may be substantially duplicated such that each arcuate channel 406 is repeated such the two channels 306 of similar shape extend in a substantially parallel manner through the substantially cylindrical body 402. Stated in another way, the fluid flow control device 401 may include two (or more) helical structures of channels 406 (e.g., where a first helical structure of channels 406 is received within another helical structure of channels 406).

Figures 7, 8:
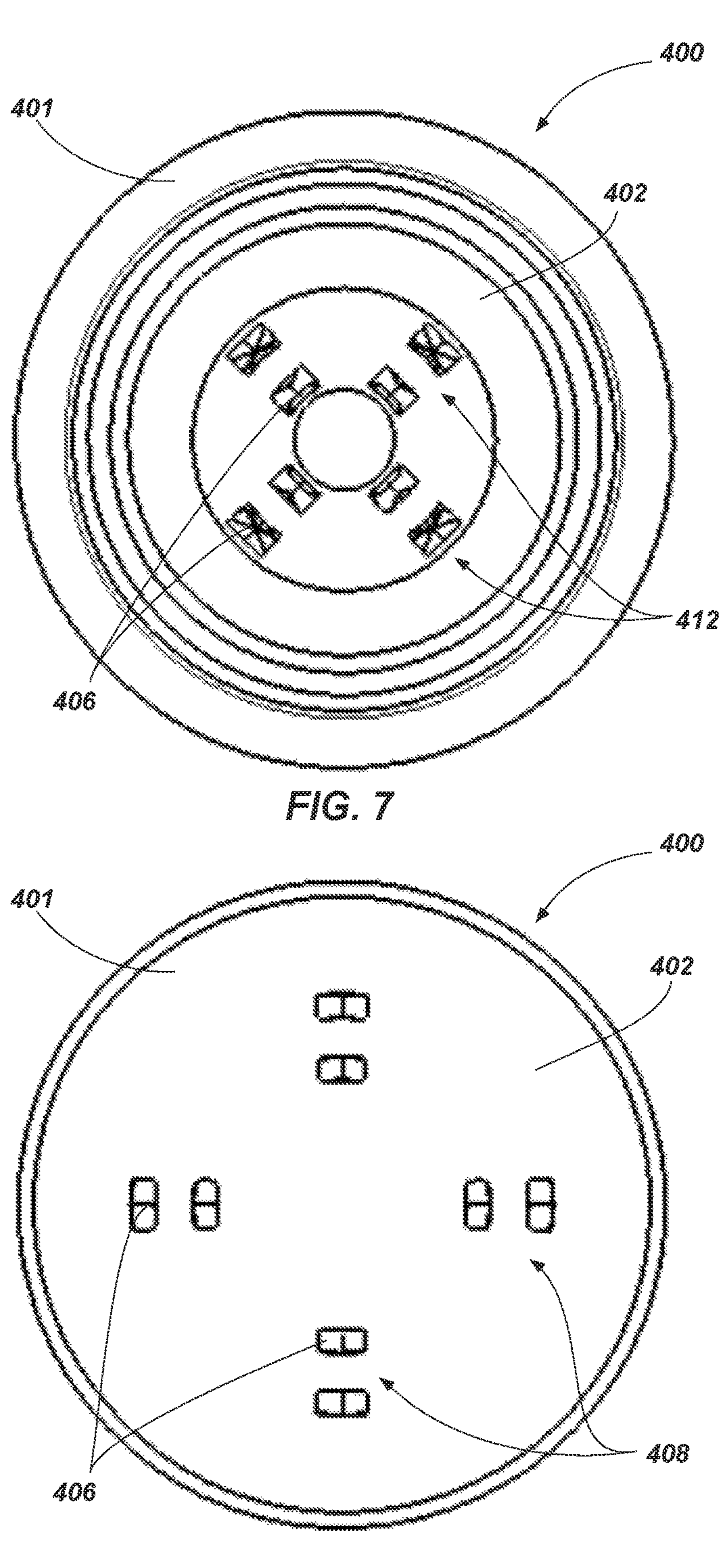
FIGS. 7 and 8 are end views of the fluid flow control device of FIG. 6.

FIGS. 7 and 8 are end views of the fluid flow control device 401 of FIG. 6. As shown in FIGS. 7 and 8, the multiple helical structures of channels 406 may begin at additional fluid inlets 408 and terminate at additional fluid outlets 412 (e.g., as compared to the fluid inlets 108 and outlets 112 shown in FIG. 3). For example, the fluid inlets 408 and the fluid outlets 412 of each helical structure of channels 406 may lie within concentric circles and may be aligned with or offset from the outlets of an adjacent helical structure of channels 406.

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and legal equivalents, of the claims which follow.

What is claimed is:

1. A fluid flow control device, comprising:

a single-piece substantially cylindrical body extending along a longitudinal axis, the single-piece substantially cylindrical body having a fluid inlet at a first axial end of the single-piece substantially cylindrical body and a fluid outlet at a second axial end of the single-piece substantially cylindrical body; and arcuate intersecting channels having a curved shape along a length of the channels, the channels extending through an interior portion of the single-piece substantially cylindrical body from the fluid inlet at the first axial end to the fluid outlet at the second axial end, the channels collectively defining fluid pathways through the single-piece substantially cylindrical body to reduce a pressure of a fluid traveling through the fluid pathways, each of the arcuate channels intersecting two or more other channels of the channels, wherein the channels extending between the fluid inlet at the first axial end and the fluid outlet at the second axial end are interior to, enclosed by, and entirely defined by the single-piece substantially cylindrical body; and wherein at least some of the channels extend longitudinally at a first substantially constant radial position from the longitudinal axis through the substantially cylindrical body and then vary from the first substantially constant radial position to extend toward the longitudinal axis as the channels approach the fluid outlet.

2. The fluid flow control device of claim 1, wherein each of the channels intersects at more than one other channel of the channels to reduce the pressure of the fluid traveling through the fluid pathways prior to exiting the single-piece substantially cylindrical body at the fluid outlet.

3. The fluid flow control device of claim 1, wherein all of the channels extend radially inward through a portion of the substantially cylindrical body as the channels approach the fluid outlet.

4. The fluid flow control device of claim 1, wherein the substantially cylindrical body comprises a monolithic structure with the channels defined within the monolithic structure.

5. The fluid flow control device of claim 1, wherein the substantially cylindrical body is formed by an additive manufacturing process.

6. The fluid flow control device of claim 1, wherein the single-piece substantially cylindrical body defines an entirety of the fluid pathways.

7. A method of decreasing pressure in a fluid with the fluid flow control device of claim 1, the method comprising:

receiving a high-pressure fluid into the fluid inlet of the body at the first axial end of the body;

directing the high-pressure fluid through the channels defined within the body to lower pressure in the high-pressure fluid to a lower-pressure fluid; and exiting the lower-pressure fluid at the fluid outlet of the body at the second axial end of the body.

8. A method of forming a fluid flow control device, comprising:

building up the substantially cylindrical body of the fluid flow control device of claim 1 through an additive manufacturing process; and concurrently defining the channels in the substantially cylindrical body during the additive manufacturing process.

9. The fluid flow control device of claim 1, wherein the channels extend through the substantially cylindrical body at an oblique angle with respect to the longitudinal axis.

10. The fluid flow control device of claim 9, wherein the channels define a helical pattern extending with the substantially cylindrical body.

11. The fluid flow control device of claim 1, wherein all of the channels are positioned at a first substantially constant radial position through the substantially cylindrical body and then vary from the first substantially constant radial position to extend toward the longitudinal axis as the channels approach the fluid outlet.

12. The fluid flow control device of claim 11, wherein the channels are positioned and configured such that fluid flow from the channels impinges upon the fluid flow from at least one adjacent channel of the channels at the fluid outlet.

13. The fluid flow control device of claim 1, wherein the substantially cylindrical body comprises an axially extending cavity at the second axial end extending into the substantially cylindrical body and being radially surrounded by the substantially cylindrical body, and wherein at least a portion of the fluid outlet is defined within the axially extending cavity.

14. The fluid flow control device of claim 13, wherein the substantially cylindrical body includes a substantially cone-shaped protrusion positioned within the axially extending cavity surrounded by outlets of the channels to direct fluid flow at the fluid outlet.

15. A fluid flow control device, comprising:

a substantially cylindrical body extending along a longitudinal axis, the substantially cylindrical body having a fluid inlet at a first axial end of the substantially cylindrical body and a fluid outlet at a second axial end of the substantially cylindrical body; and channels extending through an interior portion of the substantially cylindrical body from the fluid inlet at the first axial end to the fluid outlet at the second axial end, the channels collectively spiral within the substantially cylindrical body to define curved intersecting fluid pathways through the substantially cylindrical body to reduce a pressure of a fluid traveling through the fluid pathways, each of the channels intersecting at least one other channel of the channels, wherein radial positions of at least some of the channels remain at a first substantially constant radial position along a length of the cylindrical body and change from the first substantially constant radial position as the channels approach the fluid outlet where the radial positions of the at least some of the channels vary from the first substantially constant radial position to extend radially inward and angle toward the longitudinal axis such that the at least some of the channels are positioned relatively closer to the longitudinal axis at the fluid outlet as compared to at the fluid inlet.

16. The fluid flow control device of claim 15, wherein the channels are positioned and configured such that fluid flow from the channels is directed radially inward to impinge upon the fluid flow from at least one other channel of the channels at the fluid outlet.

17. The fluid flow control device of claim 15, wherein the radial positions of the channels are substantially constant until the channels begin to converge as the channels approach the fluid outlet.

18. A fluid flow control device, comprising:

a single-piece substantially cylindrical body extending along a longitudinal axis, the substantially cylindrical body having a fluid inlet at a first axial end of the substantially cylindrical body and a fluid outlet at a second axial end of the substantially cylindrical body; and curved intersecting channels extending through an interior portion of the substantially cylindrical body from the fluid inlet at the first axial end to the fluid outlet at the second axial end, the channels collectively defining fluid pathways through the substantially cylindrical body to reduce a pressure of a fluid traveling through the fluid pathways, each of the channels intersecting at least one other channel of the channels, wherein at least some of the channels extend longitudinally at a substantially constant radial position from the longitudinal axis and then vary from the substantially constant radial position as the channels approach the fluid outlet, and wherein the single-piece substantially cylindrical body comprises an axially extending cavity at the second axial end integrally defined within and extending into the single-piece substantially cylindrical body and being radially surrounded by an outer portion of the substantially cylindrical body, the axially extending cavity exhibiting a tapered shape having an enlarging cross-sectional area as the axially extending cavity opens at a terminal end of the substantially cylindrical body and wherein the fluid outlet is defined within the axially extending cavity.

19. The fluid flow control device of claim 18, wherein the curved channels are encompassed by continuous portions of the substantially cylindrical body, the continuous portions of the substantially cylindrical body further defining the axially extending cavity.

20. A fluid flow control device, comprising:

a substantially cylindrical body extending along a longitudinal axis, the substantially cylindrical body having a fluid inlet at a first axial end of the substantially cylindrical body and a fluid outlet at a second axial end of the substantially cylindrical body; and channels extending through an interior portion of the substantially cylindrical body from the fluid inlet at the first axial end to the fluid outlet at the second axial end, the channels collectively defining fluid pathways through the substantially cylindrical body to reduce a pressure of a fluid traveling through the fluid pathways, each of the channels intersecting at least one other channel of the channels, wherein the substantially cylindrical body includes a substantially cone-shaped protrusion to direct fluid flow at the fluid outlet, the substantially cone-shaped protrusion being surrounded by outlets of the fluid pathways.

* * * * *